United States Patent [19]

Inoue et al.

[11] Patent Number: 4,703,370

[45] Date of Patent: Oct. 27, 1987

[54] HELICAL SCAN TYPE MAGNETIC TAPE REPRODUCING APPARATUS WITH VARIABLE HEAD-DRUM INCLINATION CAPABILITY

[75] Inventors: Osamu Inoue; Akira Ohbayashi, both of Yokohama, Japan

[73] Assignee: Victor Company of Japan, Ltd., Japan

[21] Appl. No.: 706,110

[22] Filed: Feb. 27, 1985

[30] Foreign Application Priority Data

Mar. 5, 1984 [JP] Japan ............................ 59-31464[U]

[51] Int. Cl.$^4$ ...................... G11B 5/588; H04N 5/783
[52] U.S. Cl. ................................... 360/10.2; 360/10.3; 360/77; 360/109; 360/130.24
[58] Field of Search ............... 358/312; 368/10.2, 10.3, 368/70, 75, 76, 77, 107, 109, 130.24, 130.23, 130.22, 129; 360/84

[56] References Cited

U.S. PATENT DOCUMENTS

| | | | |
|---|---|---|---|
| 3,375,331 | 3/1968 | Okazaki et al. | 360/10.2 |
| 3,697,676 | 10/1972 | Protas | 360/10.2 |
| 3,995,317 | 11/1976 | Schmidt | 360/130.24 |
| 4,048,661 | 9/1977 | Staar | 360/130.24 |
| 4,423,447 | 12/1983 | Nishida et al. | 360/109 |
| 4,564,876 | 1/1986 | Takahashi et al. | 360/10.2 |

FOREIGN PATENT DOCUMENTS 2060974 5/1981 United Kingdom .
2067793 7/1981 United Kingdom .
2137400 10/1984 United Kingdom .

*Primary Examiner*—Raymond F. Cardillo
*Assistant Examiner*—Robert A. Weinhardt
*Attorney, Agent, or Firm*—Andrus, Sceales, Starke & Sawall

[57] ABSTRACT

A magnetic tape reproducing apparatus comprises a tape guide drum spirally wrapped with a magnetic tape on an outer peripheral surface thereof, a first mechanism for pivotally supporting the drum, and second mechanism for varying the inclination angle of the drum in a special reproduction mode of the reproducing apparatus, which special reproduction mode is a reproduction mode in which the tape moves with a tape moving speed and/or a tape moving direction different from a tape moving speed and/or a tape moving direction in a normal reproduction mode (or recording mode). The second mechanism varies the inclination angle of the drum in the special reproduction mode in one of two mutually opposite directions with respect to a reference inclination angle of the drum at the time of the normal reproduction mode. The second mechanism varies the inclination angle of the drum depending on the tape moving speed and direction of the tape in the special reproduction mode so that an inclination angle of scanning loci of rotary video heads with respect to the tape longitudinal direction becomes equal to an inclination angle of video tracks on the tape with respect to the tape longitudinal direction.

4 Claims, 7 Drawing Figures

HELICAL SCAN TYPE MAGNETIC TAPE REPRODUCING APPARATUS WITH VARIABLE HEAD-DRUM INCLINATION CAPABILITY

BACKGROUND OF THE INVENTION

The present invention generally relates to magnetic tape reproducing apparatuses, and more particularly to a magnetic tape reproducing apparatus of the helical scan type.

In a helical scan type magnetic tape reproducing apparatus, a magnetic tape having video tracks formed obliquely to the longitudinal direction thereof is wrapped spirally and guided around an outer peripheral surface of a tape guide drum. Rotary video heads mounted on the guide drum scan obliquely to the longitudinal direction of the magnetic tape so as to scan over the video tracks and reproduce recorded video signals from the video tracks. In a normal reproducing mode in which the magnetic tape moves in a direction (forward direction) at a speed essentially identical to the tape moving direction (forward direction) and tape moving speed at the time of the recording, scanning loci of the rotary video heads coincide with the video tracks on the magnetic tape. However, in a special reproduction mode in which the tape moving direction and/or the tape moving speed is different from the tape moving speed and/or the tape moving direction at the time of the recording, the scanning loci of the rotary video heads do not coincide with the video tracks on the magnetic tape. In the special reproduction mode, each scanning loci of the rotary video heads traverses a plurality of video tracks, and as a result, noise is inevitably generated in a reproduced picture.

In order to suppress the generation of noise during the special reproduction mode, there is a conventional reproducing apparatus in which the rotary video heads are supported on piezoelectric elements. The piezoelectric elements are bent (deformed) by applying an external voltage to the piezoelectric elements, so that the rotary video heads scan along the video tracks on the magnetic tape. However, due to the limitation introduced by the response speed and the bending quantity of the piezoelectric elements, the rotary video heads cannot follow the video tracks when the tape moving speed in the special reproduction mode becomes greater than approximately three times the tape moving speed of the normal reproduction mode. Therefore, when the tape moving speed in the special reproduction mode is high, each of the rotary video heads traverse a plurality of tracks and noise is generated in the reproduced picture. In other words, the conventional reproducing apparatus has a disadvantage in that the range of the tape moving speed in the special reproduction mode that will not generate noise, is limited to a relatively small range. In addition, the piezoelectric elements of the conventional reproducing apparatus requires a complex control. Thus, there are disadvantages in that a control system for controlling the piezoelectric elements of the conventional reproducing apparatus is complex and expensive.

SUMMARY OF THE INVENTION

Accordingly, it is a general object of the present invention to provide a novel and useful magnetic tape reproducing apparatus in which the disadvantages described heretofore are overcome.

Another and more specific object of the present invention is to provide a magnetic tape reproducing apparatus in which the inclination of a tape guide drum is variable in two mutually opposite directions with respect to a reference inclination angle and the tape drum is inclined depending on the moving speed and moving direction of a magnetic tape so that moving loci of rotary video heads coincide with video tracks on the magnetic tape. According to the reproducing apparatus of the present invention, it is possible to obtain a reproduced picture having no noise even in a case where the magnetic tape is stationary, a case where the magnetic tape moves at a speed which is approximately three times the tape moving speed in a normal reproduction mode and a case where the magnetic tape moves at a speed which is greater than approximately three times the tape moving speed in the normal reproduction mode, where the tape moving speed in the normal reproduction mode is essentially identical to the tape moving speed at the time of a recording. Further, construction of the reproducing apparatus according to the present invention is relatively simple.

Other objects and further features of the present invention will be apparent from the following detailed description when read in conjunction with the accompanying drawings.

DETAILED DESCRIPTION

First, a description will be given with respect to the scanning loci of rotary video heads of a conventional helical scan type magnetic tape reproducing apparatus in various reproduction modes, by referring to FIG. 1.

Figure 1:
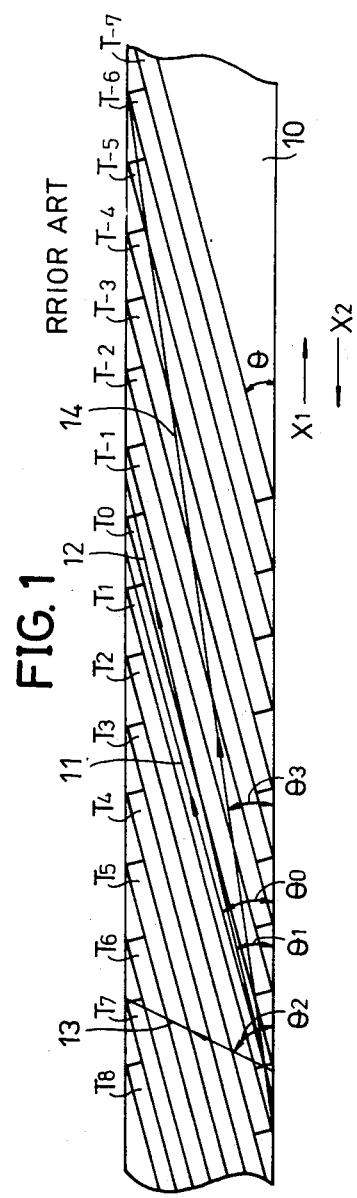
FIG. 1 shows a video track pattern on a magnetic tape and scanning loci of rotary video heads in a normal reproduction mode and a special reproduction mode of a conventional magnetic tape reproducing apparatus.

In FIG. 1, video tracks $T_{-7}$ through $T_8$ are formed obliquely to the longitudinal direction of a magnetic tape 10. The video tracks $T_{-7}$ through $T_8$ are formed contiguously, and are inclined by an angle $\theta$ with respect to the longitudinal direction of the tape 10. For example, $\theta$ is equal to $5°58'9.9''$.

In a normal reproduction mode, the tape 10 moves in a forward direction $X_1$, and a rotary video head (not shown) moves over a scanning locus 11. In a still picture reproduction mode among various special reproduction modes, the tape 10 is stationary and the rotary video head moves over a scanning locus 12. In a forward search mode among the various special reproduction modes, the tape 10 moves in the forward direction $X_1$ at a speed which is seven times the tape moving speed in a normal reproduction mode, for example, and the rotary video head moves over a scanning locus 13. The tape moving direction (forward direction) and the tape moving speed in the normal reproduction mode are essentially identical to the tape moving direction (forward direction) and the tape moving speed at the time of the recording. Further, in a reverse search mode among the various special reproduction modes, the tape 10 moves in a reverse direction $X_2$ at a speed which is seven times the tape moving speed in the normal reproduction mode, for example, and the rotary video head moves over a scanning locus 14. An inclination angle $\theta_0$ of the scanning locus 11 with respect to the tape longitudinal direction is equal to the inclination angle $\theta$ of the video tracks. The scanning locus 11 coincides with the video track $T_1$ and noise will not appear in the reproduced picture. However, in the special reproduction modes, an inclination angle $\theta_1$ of the scanning locus 12 with respect to the tape longitudinal direction is equal to 5°56'7.4" which is less than the inclination angle $\theta$ of the video tracks, an inclination angle $\theta_2$ of the scanning locus 13 with respect to the tape longitudinal direction is equal to 6°10'55.59" which is greater than the inclination angle $\theta$ and an inclination angle $\theta_3$ of the scanning locus 14 is equal to 5°46'15" which is less than the inclination angle $\theta$. In other words, the inclination angle of the scanning locus in a special reproduction mode is different from the inclination angle $\theta$ of the video tracks. For this reason, the scanning loci 12, 13 and 14 each traverse a plurality of video tracks as shown in FIG. 1 and noise is generated in the reproduced picture. In FIG. 1, arrows on the scanning loci indicate the scanning direction of the rotary video head, and the same representation is used in FIGS. 5 through 7 which will be described later on in the specification.

The magnetic tape reproducing apparatus according to the present invention is designed to eliminate the problem of noise generated in the reproduced picture in the special reproduction modes.

Figure 2:
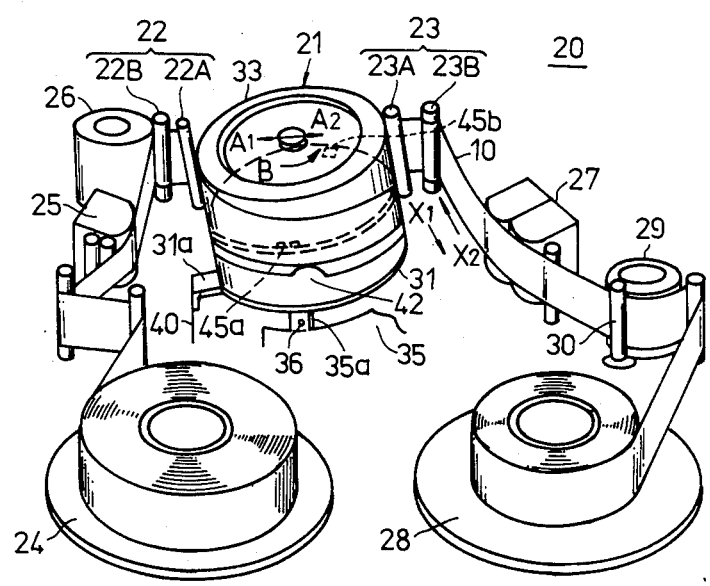
FIG. 2 is a perspective view showing an embodiment of the magnetic tape reproducing apparatus according to the present invention.
Figure 3:
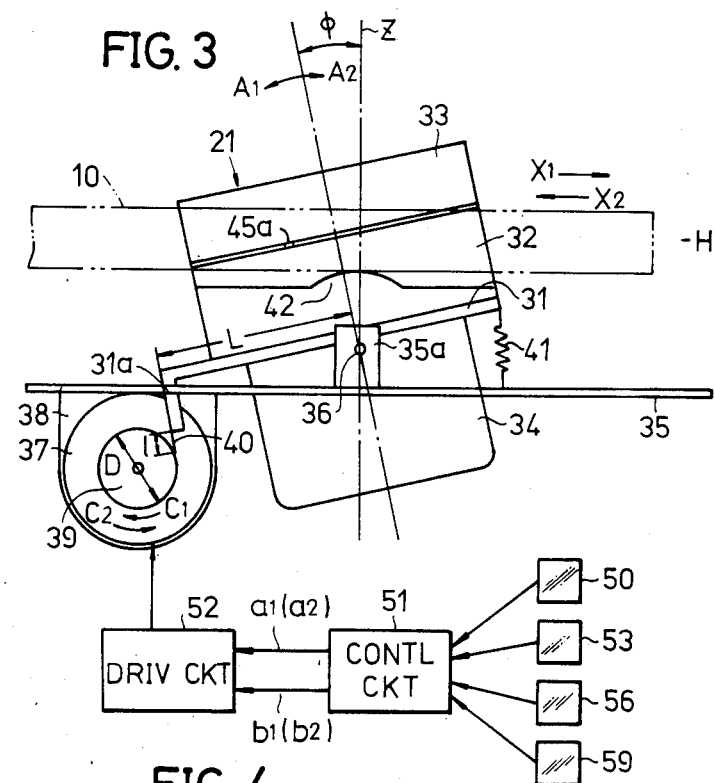
FIG. 3 shows an apparatus for varying the inclination of a tape guide drum.

A description will now be given with respect to an embodiment of the magnetic tape reproducing apparatus according to the present invention. In FIGS. 2 and 3, a magnetic tape reproducing apparatus 20 generally comprises a tape guide drum 21 which is inclined in an arrow direction $A_1$ with respect to an imaginary vertical line z, a supply tape guide pole assembly 22 located on the entrance side of the drum 21 with respect to the tape moving direction, and a take-up tape guide pole assembly 23 located on the exit side of the drum 21 with respect to the tape moving direction. The tape guide pole assemblies 22 and 23 are constituted by respective sloping guide poles 22A and 23A and respective vertical guide poles 22B and 23B each having a flange.

The tape 10 is loaded into a predetermined tape path in the reproducing apparatus 20. In the predetermined tape path, the tape 10 is drawn out from a supply reel 24 and makes contact with an erasing head 25 and an impedance roller 26. The tape 10 is then wrapped spirally around the outer peripheral surface of the drum 21 over an angular range of approximately 180° under the restriction of the sloping guide poles 22A and 23A. The tape 10 further makes contact with an audio and control head 27 and is taken up on a take-up reel 28. The tape 10 is pinched between a pinch roller 29 and a capstan 30 and is driven to move in the above predetermined tape path.

As shown in FIG. 3, the drum 21 is designed so that the inclination angle of the drum 21 can be varied in two mutually opposite directions with respect to a reference inclination angle $\phi$ which is equal to 12°41', for example. The drum 21 comprises a lower stationary drum 32 fixed on a support base 31, an upper rotary drum 33 and a drum motor 34 for rotating the upper rotary drum 33 in an arrow direction B in FIG. 2, which drum motor 34 is integrally mounted on the lower stationary drum 32. Rotary video heads 45a and 45b are mounted at diametrical positions on the upper rotary drum 33. The drum 21 is supported at two diametrical positions thereof by pins 36 (only one shown) with respect to vertical support pieces 35a (only one shown) on a chassis 35 of the reproducing apparatus 20. The diametrical positions where the drum 21 is supported, lie on an imaginary line which passes through a center axis of the drum 21 which is inclined by the reference inclination angle $\phi$ and is perpendicular to a plane which includes the imaginary vertical line z and the center axis of the drum 21 which is inclined by the reference inclination angle $\phi$. Further, the diametrical positions where the drum 21 is supported, are near the center of gravity of the drum 21 in the height direction thereof. Hence, the drum 21 is pivotally supported and the inclination can be varied in arrow directions $A_1$ and $A_2$.

A step motor 37 is mounted on a bracket 38 which is mounted on the bottom of the chassis 35. A pulley 39 is fixed to a motor shaft of the step motor 37, and one end of a rigid steel belt 40 is fixed to the pulley 39. The other end of the belt 40 is fixed to an arm 31a of the support base 31. A coil spring 41 is stretched between the chassis 35 and an end of the support base 31 opposite to the arm 31a. When the step motor 37 undergoes a step rotation in an arrow direction $C_1$, the belt 40 is taken up on the pulley 39 and the drum 21 is inclined about the pins 36 in the direction $A_1$. In other words, the inclination angle of the drum 21 is increased from the reference inclination angle $\phi$. On the other hand, when the step motor 37 undergoes a step rotation in an arrow direction $C_2$, the belt 40 is paid out from the pulley 39 and the drum 21 is inclined about the pins 36 in the direction $A_2$. In this case, the inclination angle of the drum 21 is decreased from the reference inclination angle $\phi$. Due to the rigidity of the belt 40 and the force exerted by the coil spring 41, the drum 21 maintains an inclination angle which is determined by the rotational position where the step motor 37 stops.

As will be described later on in the specification, the pulley 39 rotates within a small angular range of approximately 3°. Hence, the length l of the belt 40 is extremely short, and the belt 40 is uneasily bent or deformed. Because the drum 21 is supported at the positions near the center of gravity in the height direction thereof, the force of the drum 21 itself acting on the belt 40 so as to bend or deform the belt 40 is extremely small. Further, this small force of the drum 21 itself acting on the belt 40 is reduced by the action of the coil spring 41. Therefore, the belt 40 virtually cannot be bent or deformed. Accordingly, the inclination angle of the drum 21 is positively and stably maintained to an inclination angle which is determined by the rotational position where the step motor 37 stops.

A tape lead 42 is formed on the lower stationary drum 32 of the drum 21. The tape lead 42 has an arcuate shape about the pin 36 so that the height position H of the tape 10 will not change even when the inclination angle of the drum 21 is varied. The lower edge of the tape 10 is guided at an approximate center part of the tape lead 42, within the angular range in which the tape 10 is wrapped around the outer peripheral surface of the drum 21, and the tape 10 moves in a state maintained at the height position H.

One step rotation of the step motor 37 is set to 0.36°, the diameter D of the pulley 39 is set to 10 mm and the distance L between the pin 36 and the arm 31a is set to 50 mm, so that the inclination angle of the drum 21 becomes equal to an inclination angle in correspondence with the still picture reproduction mode when the step motor 37 undergoes one step rotation.

Figure 4:
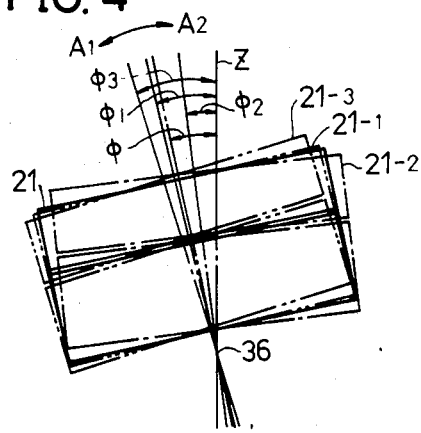
FIG. 4 shows the inclination of the tape guide drum in the special reproduction mode.

Next, a description will be given with respect to the inclination of the drum 21 in the normal reproduction mode and the special reproduction modes, by referring to FIG. 4.

In a normal state, the step motor 37 is stopped at a reference rotational position and the inclination angle of the drum 21 is equal to the reference inclination angle $\phi$.

When a play button 50 is manipulated, no signal is produced from a control circuit 51 and a driving circuit 52 does not operate. Accordingly, the step motor 37 remains stopped and the inclination angle of the drum 21 is maintained to the reference inclination angle $\phi$. In addition, the tape 10 moves in the forward direction $X_1$ at the tape moving speed which is equal to the tape moving speed during the normal reproduction mode. The rotary video heads 45a and 45b alternately scan over the video tracks on the tape 10.

For example, the control circuit 51 is constituted by a microcomputer (not shown) and detects the reproduction mode of the reproducing apparatus 20. The control circuit 51 produces a rotational direction signal $b_1$ (or $b_2$) and a pulse signal $a_1$ (or $a_2$) comprising a number of pulses depending on the detected mode.

When a still picture reproduction button 53 is manipulated, the tape 10 stops moving and the pulse signal $a_1$ and the rotational direction signal $b_1$ are produced from the control circuit 51. The driving circuit 52 operates responsive to the signals $a_1$ and $b_1$ and rotates the step motor 37 in the direction $C_1$ by one step and then stops the step motor 37. Accordingly, the pulley 39 rotates in the direction $C_1$ over an angle of 0.36°, and the drum 21 is pulled slightly by the belt 40. As a result, the drum 21 pivots slightly in the direction $A_1$ and the inclination angle of the drum 21 slightly increases from the reference inclination angle $\phi$ by an angle $(\theta_0-\theta_1)$. In other words, the inclination angle of the drum 21 is varied from the reference inclination angle $\phi$ to an inclination angle $\phi_1$ which is approximately equal to 12°43′, for example, and the drum 21 assumes a position 21-1 shown in FIG. 4.

Figure 5:
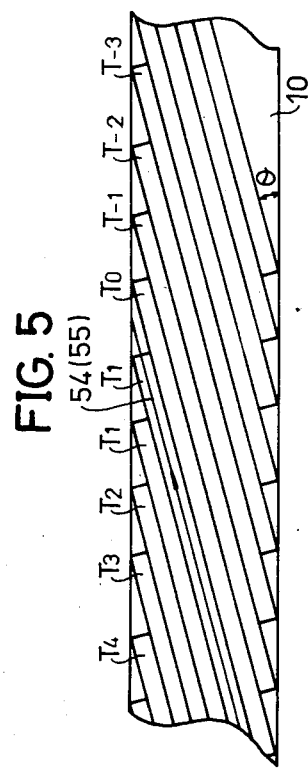
FIGS. 5, 6 and 7 show the video track pattern on the magnetic tape and scanning loci of the rotary video heads in a still picture reproduction mode, a forward search mode and a reverse search mode, respectively.

Accordingly, the rotary video heads 45a and 45b scan over scanning loci 54 and 55 shown in FIG. 5. The inclination angle of the scanning loci 54 and 55 is equal to the inclination angle $\theta$ of the video tracks on the tape 10, and the scanning loci 54 and 55 coincide with the video track $T_1$. Hence, it is possible to obtain a reproduced picture containing no noise.

When a forward search button 56 is manipulated, the tape 10 moves in the forward direction $X_1$ at a tape moving speed which is seven times the tape moving speed during the normal reproduction mode, for example. In this case, the control circuit 51 produces the pulse signal $a_2$ and the rotational direction signal $b_2$. The driving circuit 52 operates responsive to the signals $a_2$ and $b_2$ and rotates the step motor 37 in the direction $C_2$ by five steps and then stops the step motor 37. Hence, the pulley 39 rotates in the direction $C_2$ over an angle of 1.8° and the drum 21 is pushed slightly by the belt 40. As a result, the drum 21 pivots slightly in the direction $A_2$ and assumes a position 21-2 shown in FIG. 4. In other words, the inclination angle of the drum 21 decreases from the reference inclination angle $\phi$ by an angle $(\theta_2-\theta_0)$ to an inclination angle $\phi_2$ which is approximately equal to 12°28′, for example.

Figure 6:
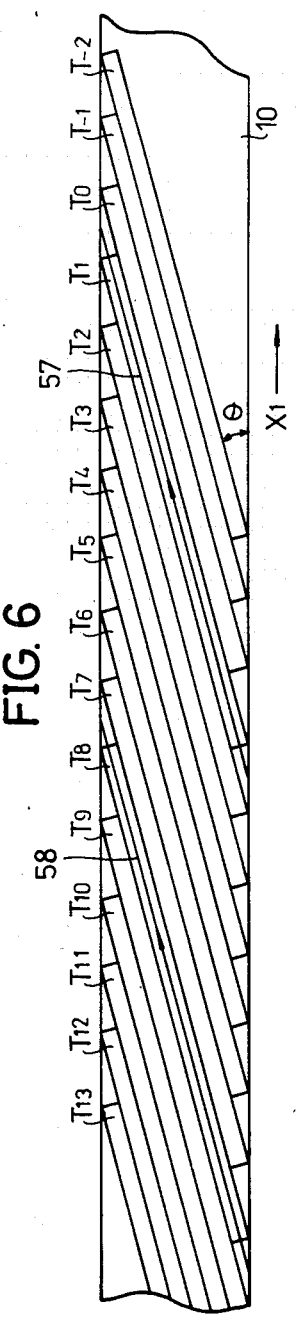

Accordingly, the rotary video heads 45a and 45b scan over scanning loci 57 and 58 shown in FIG. 6. The inclination angle of the scanning loci 57 and 58 is equal to the inclination angle $\theta$ of the video tracks on the tape 10, and the scanning locus 57 of one rotary video head coincides with the video track $T_1$ on the tape 10 and the scanning locus 58 of the other rotary video head coincides with the video track $T_8$ on the tape 10. The scanning loci 57 and 58 do not traverse a plurality of video tracks. Hence, it is possible to obtain a reproduced picture containing no noise.

When a reverse search button 59 is manipulated, the tape 10 moves in the reverse direction $X_2$ at a tape moving speed which is seven times the tape moving speed during the normal reproduction mode, for example. In this case, the control circuit 51 produces the pulse signal $a_2$ and the rotational direction signal $b_1$. The driving circuit 52 operates responsive to the signals $a_2$ and $b_1$ and rotates the step motor 37 in the direction $C_1$ by five steps and then stops the step motor 37. Hence, the pulley 39 rotates in the direction $C_1$ over an angle of 1.8° and the drum 21 is pulled slightly by the belt 40. As a result, the drum 21 pivots slightly in the direction $A_1$ and assumes a position 21-3 shown in FIG. 4. In other words, the inclination angle of the drum 21 increases from the reference inclination angle $\phi$ by an angle $(\theta_0-\theta_3)$ to an inclination angle $\phi_3$ which is approximately equal to 12°52′54.9″, for example.

Figure 7:
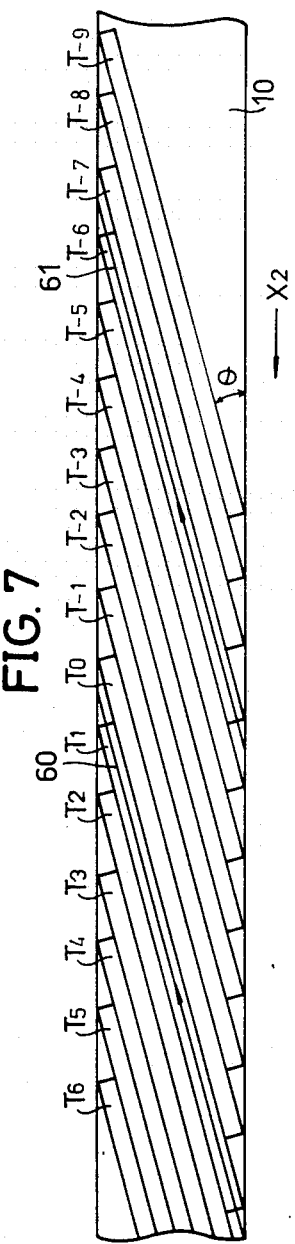

Accordingly, the rotary video heads 45a and 45b scan over scanning loci 60 and 61 shown in FIG. 7. The inclination angle of the scanning loci 60 and 61 is equal to the inclination angle $\theta$ of the video tracks on the tape 10, and the scanning locus 60 of one rotary video head coincides with the video track $T_1$ on the tape 10 and the scanning locus 61 of the other rotary video head coincides with the video track $T_{-6}$ on the tape 10. The scanning loci 60 and 61 do not traverse a plurality of video tracks. Hence, it is possible to obtain a reproduced picture containing no noise.

Because the drum 21 is supported near the center of gravity thereof, the inclination angle of the drum 21 can be varied smoothly in two mutually opposing directions with respect to the reference inclination angle $\phi$ depending on the reproduction mode of the reproducing apparatus 20, with a satisfactory response characteristic.

Further, the present invention is not limited to these embodiments, but various variations and modifications may be made without departing from the scope of the present invention.

What is claimed is:

1. A magnetic tape reproducing apparatus comprising:
 a tape guide drum assembly comprising rotary video heads, a stationary drum, a rotary drum rotatably provided on top of said stationary drum and mounted with said rotary video heads, a drum motor fixed under said stationary drum for rotating said rotary drum, pins disposed at diametrical positions of said tape guide drum assembly, and a tape lead disposed on said stationary drum to have an arcuate shape about one of said pins, said tape guide drum assembly being spirally wrapped with a magnetic tape on an outer peripheral surface thereof, said magnetic tape having a track pattern in which video tracks are formed obliquely to the tape longitudinal direction;

support means for pivotally supporting said tape guide drum assembly at said pins; and inclination angle varying means for varying the inclination angle of said tape guide drum assembly in a special reproduction mode of the reproducing apparatus, said special reproduction mode being a reproduction mode in which said magnetic tape moves with a tape moving speed and/or a tape moving direction different from a tape moving speed and/or a tape moving direction in a normal reproduction mode, said normal reproduction mode being a reproduction mode in which said magnetic tape moves at a tape moving speed and a tape moving direction essentially identical to a tape moving speed and a tape moving direction at the time of a recording, said inclination angle varying means varying the inclination angle of said tape guide drum assembly in said special reproduction mode in one of two mutually opposite directions with respect to a reference inclination angle of said tape guide drum assembly at the time of said normal reproduction mode, said inclination angle varying means varying the inclination angle of said tape guide drum assembly depending on the tape moving speed and tape moving direction of said magnetic tape in said special reproduction mode so that an inclination angle of scanning loci of said rotary video heads with respect to the tape longitudinal direction becomes equal to an inclination angle of said video tracks with respect to the tape longitudinal direction.

2. A magnetic tape reproducing apparatus as claimed in claim 1 in which said inclination angle varying means comprises a step motor, a pulley fixed to a motor shaft of said step motor, a steel belt having one end thereof fixed to said pulley and having the other end thereof fixed to a part of said tape guide drum assembly, and drive control means for rotating said step motor in a predetermined direction by a predetermined number of steps depending on the reproduction mode of said reproducing apparatus, said pulley rotating in a direction to take up said steel belt when increasing the inclination angle of said tape guide drum assembly with respect to an imaginary vertical line and rotating in a direction to pay out said steel belt when decreasing the inclination angle of said tape guide drum assembly with respect to said imaginary vertical line.

3. A magnetic tape reproducing apparatus as claimed in claim 1 in which said pins are disposed on said tape guide drum assembly in vicinities of the center of gravity of said tape guide drum assembly in a height direction of said tape guide drum assembly.

4. A magnetic tape reproducing apparatus as claimed in claim 2 in which said inclination angle varying means further comprises a spring member acting on said tape guide drum assembly so as to decrease the inclination angle of said tape guide drum assembly from said reference inclination angle.

* * * * *